US 6,317,534 B1

(12) United States Patent
Miyazaki et al.

(10) Patent No.: US 6,317,534 B1
(45) Date of Patent: Nov. 13, 2001

(54) OPTICAL WAVELENGTH ROUTING DEVICE

(75) Inventors: Tetsuya Miyazaki, Saitama; Shu Yamamoto, Tokyo; Koichi Maru; Hisato Uetsuka, both of Ibaraki, all of (JP)

(73) Assignees: Kokusai Denshin Denwa Co., Ltd.; Hitachi Cable Ltd., both of Tokyo (JP)

( * ) Notice: Subject to any disclaimer, the term of this patent is extended or adjusted under 35 U.S.C. 154(b) by 0 days.

(21) Appl. No.: 09/215,225

(22) Filed: Dec. 18, 1998

(30) Foreign Application Priority Data

Feb. 26, 1998 (JP) .................................................. 10-045435

(51) Int. Cl.[7] .................................................. G02B 6/28
(52) U.S. Cl. .................................................. 385/24; 385/37
(58) Field of Search .......................... 385/24, 37; 359/127

(56) References Cited

U.S. PATENT DOCUMENTS

| 5,224,183 | * | 6/1993 | Dugan | ..................................... 385/24 |
| 5,412,744 | | 5/1995 | Dragone . | |
| 5,467,418 | * | 11/1995 | Dragone | ................................. 385/37 |
| 5,745,612 | * | 4/1998 | Wang et al. | ............................ 385/24 |
| 6,069,990 | * | 5/2000 | Okawa et al. | ......................... 385/43 |

FOREIGN PATENT DOCUMENTS 8-76155    3/1996  (JP) .

* cited by examiner

Primary Examiner—Frank G. Font
Assistant Examiner—Phil Natividad
(74) Attorney, Agent, or Firm—McDermott, Will & Emery (57) ABSTRACT

An optical wavelength routing device comprises an arrayed waveguide comprising a plurality of channel waveguides formed on a substrate, a plurality of input waveguides having 12 input ports located on an input side of the arrayed waveguide, a plurality of output waveguides having 16 input ports located on an output side of the arrayed waveguide, an input slab waveguide for coupling the plurality of input waveguides to the arrayed waveguide to provide a first coupling portion on the side of the input waveguide, and an output slab waveguide for coupling the arrayed waveguide to the plurality of output waveguides to provide a second coupling portion on the side of the output waveguide, in which central wavelengths of lights input to the input ports and output from the output ports are controlled such that a difference between a predetermined wavelength and a central wavelength is suppressed within the range of $+\delta\lambda/4$. By this structure, a maximum central wavelength difference can be suppressed at minimum.

14 Claims, 11 Drawing Sheets

| | INPUT PORT NUMBER | | | | | | | |
|---|---|---|---|---|---|---|---|---|
| | 1 | 2 | 3 | 4 | --- | M-2 | M-1 | M |
| 1 | $\lambda_1$ | $\lambda_2$ | $\lambda_3$ | $\lambda_4$ | --- | $\lambda_{M-2}$ | $\lambda_{M-1}$ | $\lambda_M$ |
| 2 | $\lambda_2$ | $\lambda_3$ | $\lambda_4$ | $\lambda_5$ | --- | $\lambda_{M-1}$ | $\lambda_M$ | $\lambda_{M+1}$ |
| 3 | $\lambda_3$ | $\lambda_4$ | $\lambda_5$ | $\lambda_6$ | --- | $\lambda_M$ | $\lambda_{M+1}$ | $\lambda_{M+2}$ |
| 4 | $\lambda_4$ | $\lambda_5$ | $\lambda_6$ | $\lambda_7$ | --- | $\lambda_{M+1}$ | $\lambda_{M+2}$ | $\lambda_{M+3}$ |
| ⋮ | ⋮ | ⋮ | ⋮ | ⋮ | ⋱ | ⋮ | ⋮ | ⋮ |
| N-2 | $\lambda_{N-2}$ | $\lambda_{N-1}$ | $\lambda_N$ | $\lambda_1$ | --- | $\lambda_{M-5}$ | $\lambda_{M-4}$ | $\lambda_{M-3}$ |
| N-1 | $\lambda_{N-1}$ | $\lambda_N$ | $\lambda_1$ | $\lambda_2$ | --- | $\lambda_{M-4}$ | $\lambda_{M-3}$ | $\lambda_{M-2}$ |
| N | $\lambda_N$ | $\lambda_1$ | $\lambda_2$ | $\lambda_3$ | --- | $\lambda_{M-3}$ | $\lambda_{M-2}$ | $\lambda_{M-1}$ |

(OUTPUT PORT NUMBER)

OPTICAL WAVELENGTH ROUTING DEVICE

FIELD OF THE INVENTION

The invention relates to an optical wavelength routing device, and more particularly to an optical wavelength routing device having a wavelength routing function used for a WDM (Wavelength Division Multiplexing) transmission for the optical communication system, in which a maximum central wavelength deviation (defined "wavelength difference" hereinafter in some cases) is reduced to minimum.

BACKGROUND OF THE INVENTION

In recent years, as a communication system providing an information service with high speed and large capacity, a WDM (Wavelength Division Multiplexing) optical communication system has been developed. In particular, as an interconnection device for an optical communication system, an optical wavelength routing device using an arrayed waveguide diffraction grating as an optical wavelength multiplexer/demultiplexer has been researched intensively.

For example, U.S. Pat. No. 5,412,744 discloses a frequency routing device having a spatially filtered optical grating for providing an increased passband width, which has a spectral efficiency maximized by providing a relatively wide passband and a relatively narrow channel spacing for a given cross talk level.

As a structure of an optical wavelength routing device using an arrayed waveguide, a structure comprising an arrayed waveguide provided between an input slab waveguide and an output slab waveguide has been known.

Figure 1A:
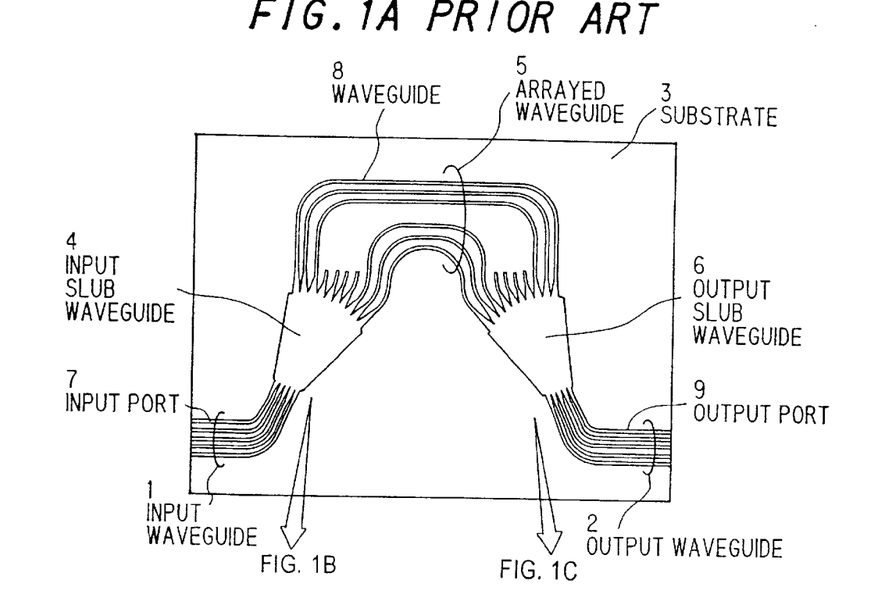
Figures 1B, 1C:
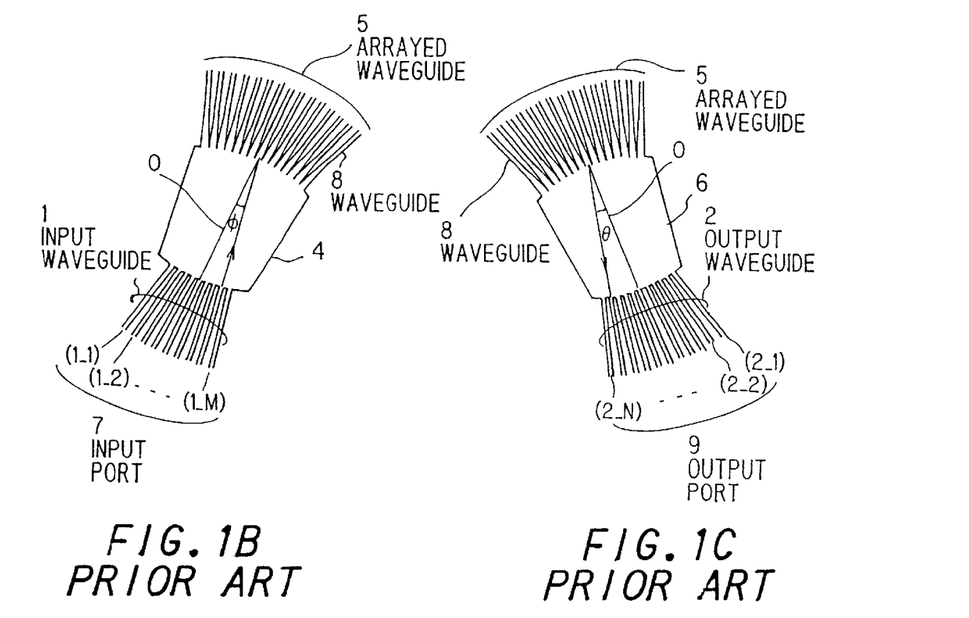
FIGS. 1B and 1C show partial enlarged views of a light input side and a light output side thereof, respectively.

FIGS. 1A to 1C show a structure of a conventional optical wavelength routing device composed of an arrayed waveguide diffraction grating type optical multiplexer/demultiplexer, wherein FIG. 1A is a schematic view of the conventional optical wavelength routing device.

As shown in FIG. 1A, the optical wavelength routing device comprises a substrate 3, input waveguides 1 having input ports 7 with a total number M, an input slab waveguide 4 coupled to the input waveguides 1, which radiates a light supplied from the input waveguides 1 with predetermined angles by diffraction, a diffraction grating type arrayed waveguide 5 composed of a plurality of waveguides 8 and coupled to an output side of the input slab waveguide 4, which transmits lights supplied from the input slab waveguide 4 through the waveguides 8, an output slab waveguide 6 coupled to an output side of the arrayed waveguide 5, which focuses the radiated lights supplied from the arrayed waveguide 5 with predetermined angles, and output waveguides 2 having output ports 9 with a total number N and being coupled to an output side of the output slab waveguide 6.

Herein, the input and output waveguides 1 and 2, the input and output slab waveguides 4 and 6, and the arrayed waveguide 5 are formed on the substrate 3. The light (optical signal) supplied to the input waveguides 1 is firstly radiated with the predetermined angles at the input slab waveguide 4 by diffraction, then transmitted through a plurality of the waveguides 8 of the arrayed waveguide 5. The radiated lights are focused at the output slab waveguide 6 and finally emitted from the output waveguides 2.

FIGS. 1B and 1C show a light input side and a light output side of the optical wavelength routing device, respectively. In FIG. 1B, the input ports 7 with the total number M of the input waveguides 1 are numbered (1_1) to (1_M), respectively, and an emitting angle of a light emitted from one of the input waveguides 1 is expressed as $\Phi$. In FIG. 1C, the output ports 9 with the total number N of the output waveguides 2 are numbered (2_1) to (2_N), respectively, and a focusing angle of the light output from respective waveguides 8 of the arrayed waveguide 5 is expressed as $\theta$. Both of the emitting angle $\Phi$ and the focusing angle $\theta$ are angles formed by respective optical axes of the lights relative to a central line O.

Figure 2:
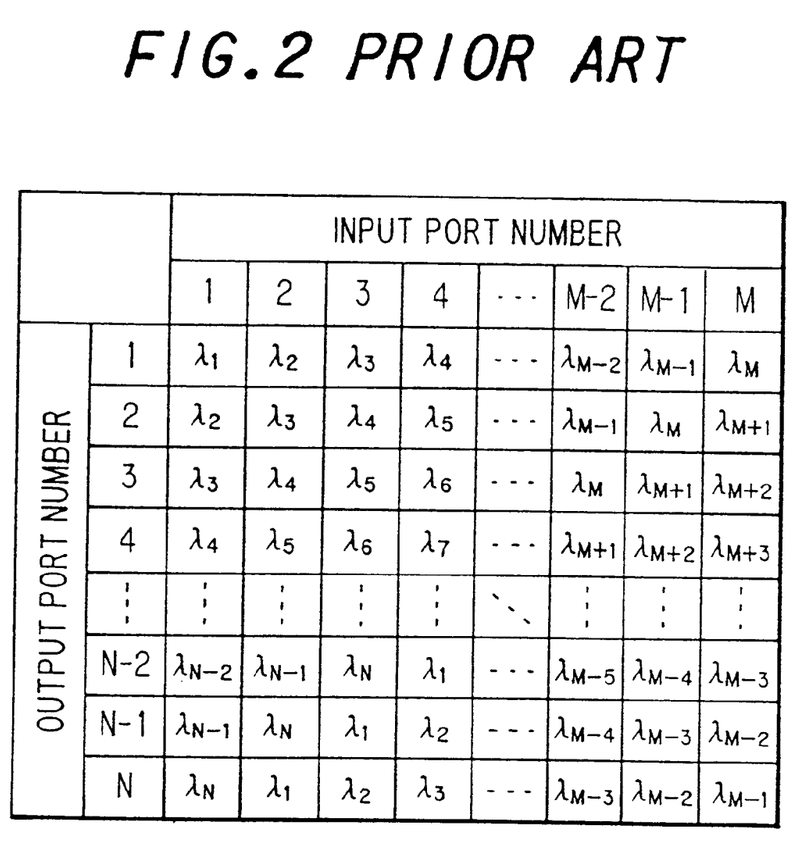
FIG. 2 is a table showing a relation between input and output ports and optical wavelengths in an ideal optical wavelength routing device.

FIG. 2 shows an example of a wavelength routing function in an ideal optical wavelength routing device, wherein the total number of the input ports is M and the total number of the output ports is N.

In this optical wavelength routing device, when wavelength division multiplexed optical signals having different wavelengths $\lambda_1, \lambda_2$ - - - $\lambda_N$ are input into the first input port, optical signals each having one of wavelengths $\lambda_1, \lambda_2$ - - - $\lambda_N$ are output from the first to Nth output ports, respectively. Further, when the wavelength division multiplexed optical signals having different wavelengths $\lambda_1, \lambda_2$, - - - $\lambda_N$ are input into the second input port, the optical signals each having one of wavelengths $\lambda_2, \lambda_3$, - - - $\lambda_N, \lambda_1$ are output from the first to Nth output ports, respectively. Still further, when the wavelength division multiplexed optical signals having different wavelengths $\lambda_1, \lambda_2$, - - - $\lambda_N$ are input into the third input port, the optical signals each having one of wavelengths $\lambda_3, \lambda_4$, - - - $\lambda_N, \lambda_1, \lambda_2$ are output in order from the first to Nth output ports, respectively. As described above, the ideal optical wavelength routing device has a routing function in which the wavelengths of the optical signals output from the output ports are circulated in accordance with the selection of an input port from the input ports.

Next, a wavelength routing function of the above explained conventional optical wavelength routing device composed of the arrayed waveguide diffraction grating type optical multiplexer/demultiplexer will be explained.

When a light having a wavelength $\lambda$ is input to each of input ports 7 of input waveguides 1, a relation of the wavelength $\lambda$ of the light, an emitting angle $\Phi$ at an input slab waveguide 4 and a focusing angle $\theta$ at an output slab waveguide 6 is given by a following formula (1):

$$\lambda = \{n_s(\lambda)d/m\} \cdot (\sin\Phi + \sin\theta) + n_{eff}(\lambda)\Delta L/m \qquad (1)$$

wherein $\Delta L$ is a waveguide length difference of two adjacent waveguides 8 of an arrayed waveguide 5, d is an interval between central axes of the two adjacent waveguides 8 at coupling portions with the input slab waveguide 4 and the output slab waveguides 6, $n_{eff}(\lambda)$ is an equivalent refractive index of the arrayed waveguide 5 for a propagated light having a wavelength $\lambda$, $n_s(\lambda)$ is an equivalent refractive index of the input slab waveguide 4 and the output slab waveguide 6 for a propagated light having a wavelength $\lambda$, and m is a diffraction order number.

Accordingly, by aligning each of the input ports 7 of the input waveguides 1 and each of the output ports 9 of the output waveguides 2 with the emitting angle $\Phi$ and the focusing angle $\theta$, respectively, a light having a central wavelength $\lambda$ given by the formula (1) is output from each of the output port 9 of the output waveguides 2. Namely, the emitting angle $\Phi$ is a locating angle for locating the input waveguides 1 and the focusing angle $\theta$ is a locating angle for locating the output waveguides 2.

In this structure, when a wavelength range of the transmitting light is sufficiently narrow and respective ranges of the locating angles for locating the input waveguides 1 and the output waveguides 2 are sufficiently narrow, it is possible to approximate $n_{eff}(\lambda)$, $n_s(\lambda)$, $\sin\Phi$, and $\sin\theta$ to $n_{eff}$, $n_s$, $\Phi$, and $\theta$, respectively. Accordingly, the relation between the wavelength $\lambda$ of the transmitting light and the locating angles $\Phi$ and $\theta$ can be linear functions.

Figure 3:
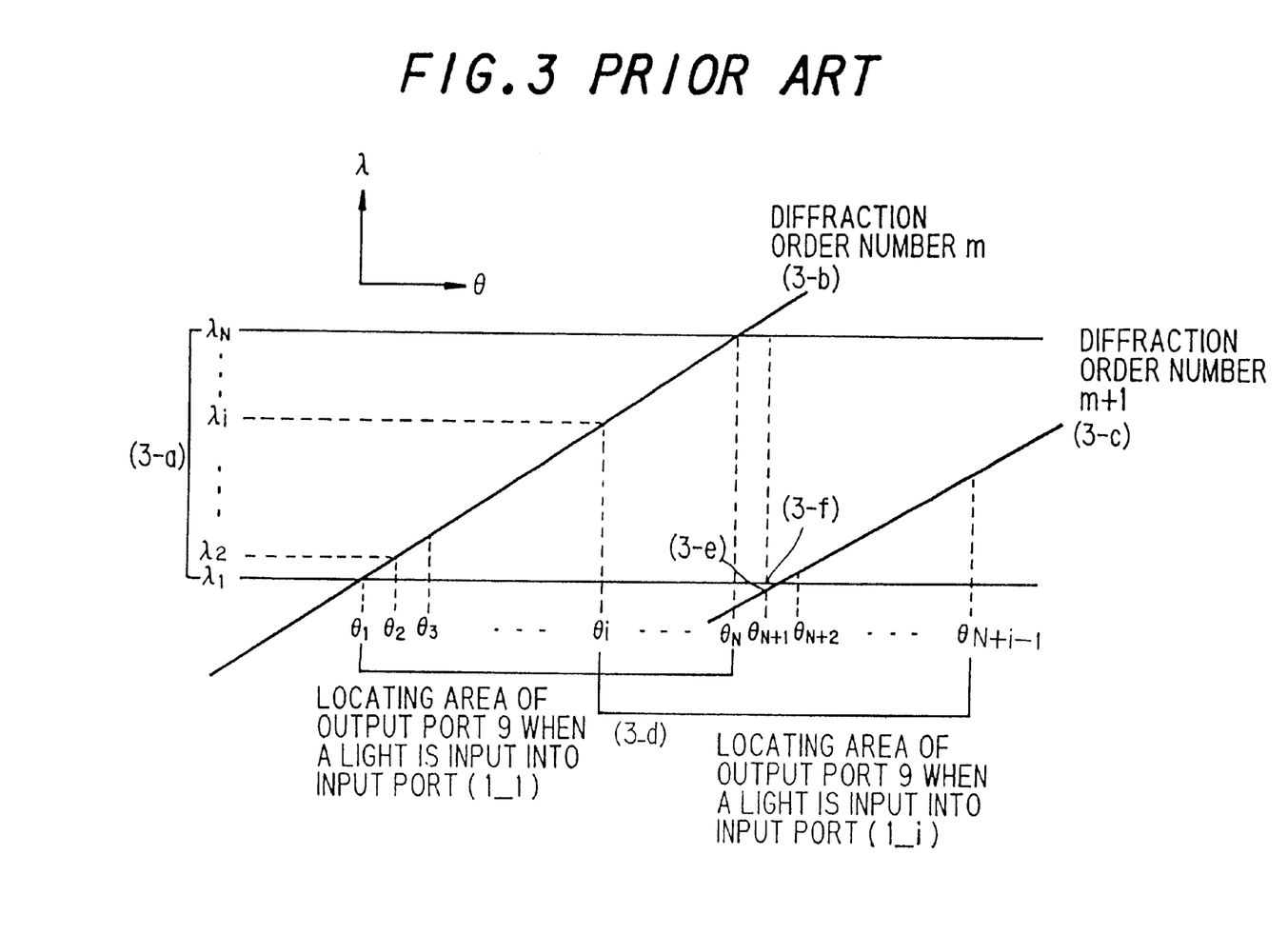
FIG. 3 is a graph showing a relation between locating angles of output ports of output waveguides and central wavelengths of output lights in the conventional optical wavelength routing device.

FIG. 3 shows a relation between the wavelength $\lambda$ of the transmitting light and the focusing angle $\theta$, when the emitting angle $\Phi$ is kept to be constant, wherein a range (3-a) of light wavelengths $\lambda_1$ to $\lambda_N$ indicates the wavelength range of the transmitting light, a curve (3-b) indicates a curve of a diffraction order number m, and a curve (3-c) indicates a curve of a diffraction order number m+1. As shown in FIG. 3, when a transmitting light (a WDM optical signal) is input into one of input ports 7 numbered (1-1), plural lights each having one of wavelengths $\lambda_1$, $\lambda_2$, - - - $\lambda_N$ are diffracted by mth order diffraction and output from respective output ports 9 numbered (2_1) to (2_N), each of which corresponds to each of focusing positions for focusing angles $\theta_1$, $\theta_2$- - - $\theta_N$.

Next, angles $\theta_N$, $\theta_{N+1}$, $\theta_{N+2}$ - - - , are presumed, each of which has a predetermined angle interval equal to an angle interval of the focusing angles $\theta_1$, $\theta_2$, - - - $\theta_N$. According to the formula (1), variations of the wavelength $\lambda$ can be equalized in both cases of varying the locating angles $\Phi$ and $\theta$, respectively, so that the influences of a varied amount $\Delta\Phi$ of the emitting angle $\Phi$ and a varied amount $\Delta\theta$ of the focusing angle $\theta$ on the wavelength $\lambda$ can be equalized. Accordingly, when $\Delta\Phi$ and $\Delta\theta$ are provided as a locating interval for each of two adjacent input ports 7 and a locating interval for each of two adjacent output ports 9, respectively, by replacing $\Delta\Phi$ with $\Delta\theta$, a light input into one of input ports 7 numbered (1_i) is output from respective output ports 9 numbered (2_1) to (2_N) (each of which actually corresponds to each of the focusing angles $\theta_1$, $\theta_2$, - - - $\theta_N$) to have the same wavelengths to those corresponding to the focusing angles $\theta_i$ - - - $\theta_{N+i-1}$ of range (3-d) for a light input into one of input ports 7 numbered (1_i).

Herein, when a diffraction order number m is determined such that a wavelength $\lambda_{m+1}$ indicated by coordinates-value (3-e), in which a diffraction order number is m+1 for a focusing angle $\theta_{N+1}$, has an approximate value of a wavelength $\lambda_1$, the wavelength $\lambda_{m+1}$ is given by a wavelength $\lambda_m$, in which a diffraction order number is m for a focusing angle $\theta_{N+1}$, in accordance with a following formula (2):

$$\lambda_{m+1} = \{n_{eff}(\lambda_{m+1})/n_{eff}(\lambda_m)\} \cdot \{m/(m+1)\} \cdot \lambda_m \quad (2)$$

wherein $\lambda_m = \Delta_N + \lambda_1$, and it is assumed that $n_s(\lambda)$ can approximate to $n_{eff}(\lambda)$ In the conventional optical wavelength routing device, by determining the diffraction order number m as described above, the coordinates-value (3_e) indicating a value of the wavelength $\lambda$ for the focusing angle $\theta_{N+1}$ can approximate to the coordinates-value (3-f) indicating a value of the wavelength $\lambda_1$ for the focusing angle $\theta_{N+1}$. When a light is input to one of the input ports 7 numbered (1_i) (wherein i ≧2), the light is output from respective output ports 9 numbered (2_(N−i+2)) to (2_N), each of which corresponds to each of the focusing angles $\theta_{N+1}$ - - - $\theta_{N+i-1}$. Since respective wavelengths of the output light have approximate values of $\lambda_1$, - - - $\lambda_{i-1}$ by the (m+1)th order diffraction, a function approximate to a predetermined routing function can be obtained.

According to the conventional optical wavelength routing device, however, when respective output ports with the total number N are arranged such that the light is input into a predetermined input port, and plural lights having predetermined central wavelengths are output from the respective output ports with the total number N, the equation shown as the formula (1) is not completely a linear function. Further, even if the curve (3-b) indicating the diffraction order number m of FIG. 3 is translated in the $\theta$ axis direction (right direction of FIG. 3), the curve (3-b) does not coincide completely with the curve (3-c) indicating the diffraction order number m+1. Although the curves (3-b) and (3-c) are made approximate to linear functions, respectively, inclinations of the linear functions approximate to the respective curves (3-b) and (3-c) are different to each other. Further, since m is an integer as shown in the formula (2), it is impossible to design the device such that a value of $\lambda_{m+1}$ should be always equal to a value of $\lambda_1$ except a particular value of $\lambda_1$, so that the coordinates-value (3-e) cannot coincide with the coordinates-value (3-f) shown in FIG. 3. Accordingly, in the conventional optical wavelength routing device, there is a disadvantage in that, when a light is input into an input port other than aforementioned predetermined input port, the light having a central wavelength which is deviated from a predetermined central wavelength is output from each of the output ports.

Figure 4:
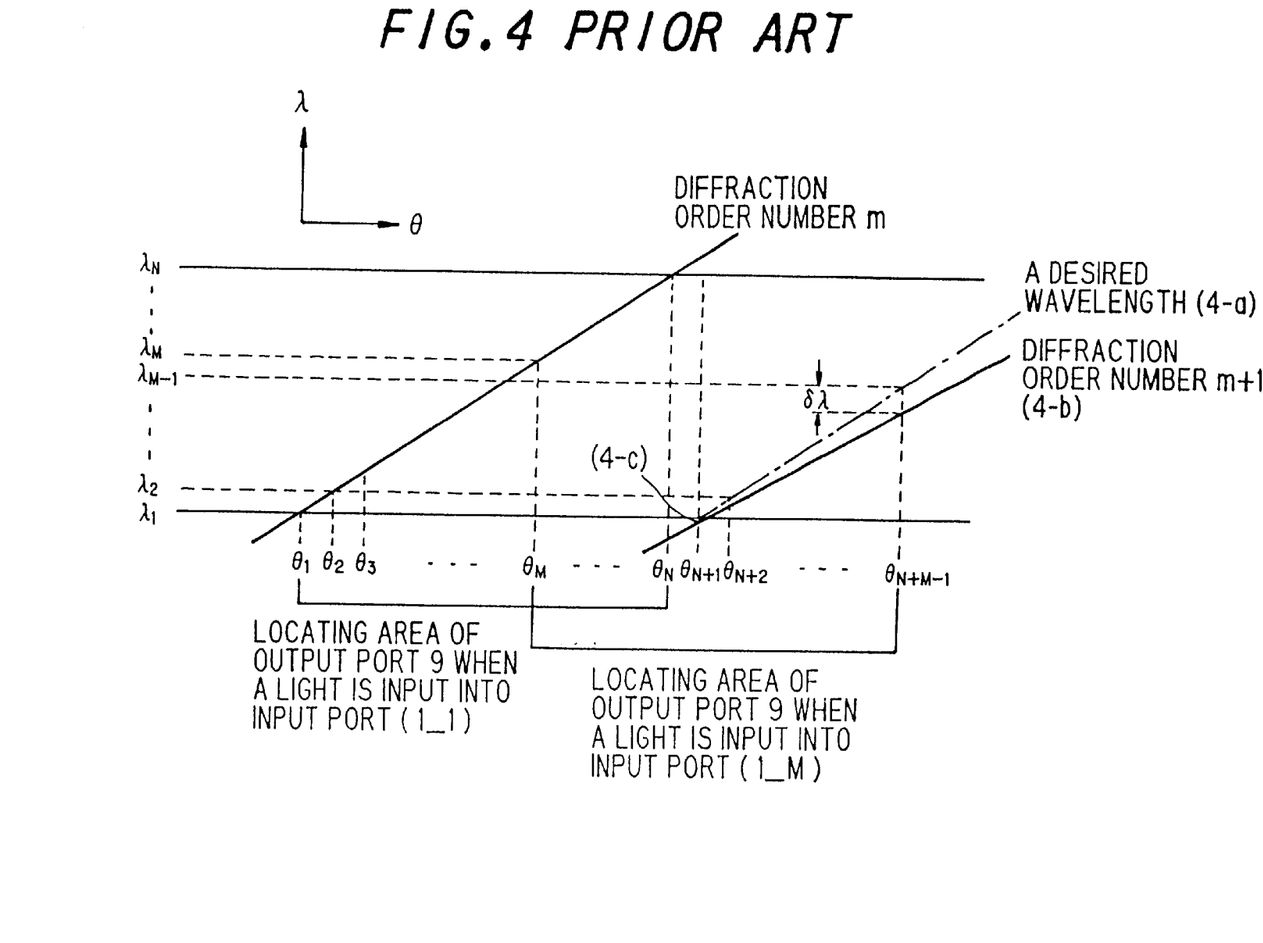
FIG. 4 is a graph showing a relation between locating angles of output ports of output waveguides and central wavelengths of output lights in the conventional optical wavelength routing device.

FIG. 4 shows a deviation of central wavelengths in a conventional optical wavelength routing device. In FIG. 4, there is shown a relation between a focusing angle $\theta$ and a wavelength $\lambda$ in the conventional optical wavelength routing device, which is designed for satisfying following conditions. When a light is input into one of the input ports 7 of the input waveguides 1 numbered (1_1), plural lights each having one of central wavelengths $\lambda_1$, $\lambda_2$, - - - $\lambda_N$ are diffracted by mth order diffraction and output from respective output ports 9 numbered (2_1) to (2_N) . Further, when a light is input into one of the other input ports 7 of the input waveguides 1 numbered (1_2) to (1_M), plural lights each having one of central wavelengths $\lambda_2$, - - - $\lambda_M$ are output from one of the output ports 9 numbered (2_1).

Herein, if a curve indicating a diffraction order number m+1 coincides with a chain line (4-a) indicating a desired wavelength, it is possible to obtain a routing function, in which a light having a predetermined central wavelength is output from each of output ports 9. However, according to the conventional optical wavelength routing device, a curve indicating the diffraction order number m+1 is actually expressed as a solid line (4-b). As shown in FIG. 4, in the conventional optical wavelength routing device, when a light is input into one of the input ports 7 numbered (1_M) and output from one of the output ports 9 numbered (2_N), an absolute value of a central wavelength difference, which is obtained by subtracting a predetermined central wavelength from a central wavelength of the light actually output from the output port, is expressed as $\delta\lambda$. The value of $\delta\lambda$ is a maximum value of the absolute values of all the central wavelength differences shown in FIG. 4, which is called as a maximum central wavelength difference.

For example, where routing operation is conducted for sixteen lights having wavelengths $\lambda_1$=1540 nm to $\lambda_{16}$=1552 nm with a channel interval of 0.8 nm by using a 12×16 channel optical wavelength routing device comprising twelve input ports 7 and sixteen output ports 9, an arrayed waveguide 5, an input slab waveguide 4, an output slab waveguide 6, input waveguides 1, and output waveguides 2 are designed so as to satisfy following conditions. In this conventional optical wavelength routing device, a light input is supplied to one of the input ports 7 of the input waveguides 1 numbered (1_1) and plural lights each having one of central wavelengths $\lambda_1$, $\lambda_2$, - - - $\lambda_{16}$ are output from respective output ports 9 numbered (2_1) to (2_16). Further, a light is input into one of the other input ports 7 of the input waveguides 1 numbered (1_2) to (1_12), and plural lights each having one of central wavelengths $\lambda_2, \text{---} \lambda_{12}$ are output from one of the output ports 9 numbered (2_1).

Figure 5:
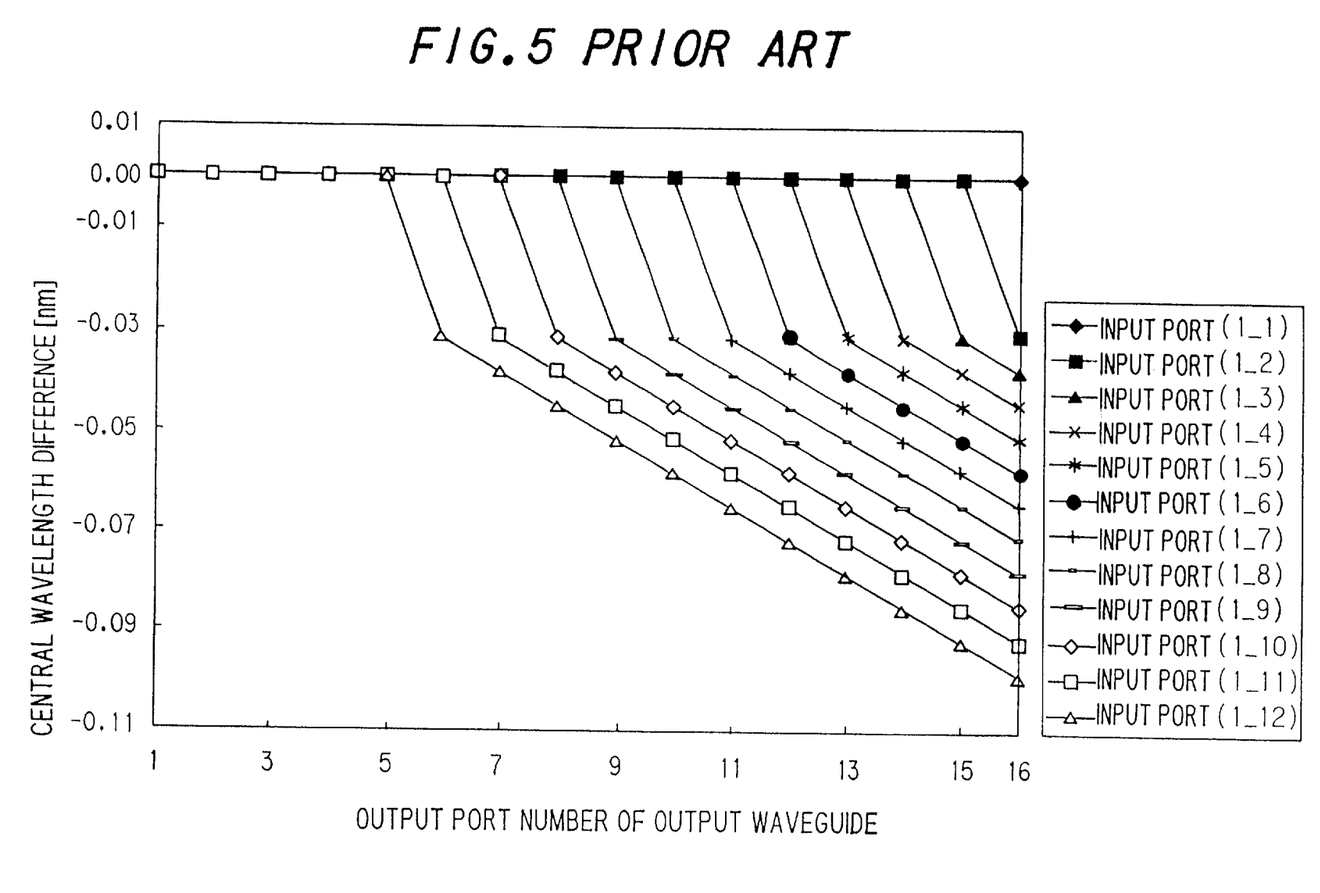
FIG. 5 is a graph showing calculated values of central wavelength differences in the conventional optical wavelength routing device.

FIG. 5 shows calculated values of central wavelength differences in the conventional optical wavelength routing device made of silica like material, which is designed as described above. As shown in FIG. 5, according to this conventional optical wavelength routing device, there is a disadvantage in that the central wavelength differences are occurred. As understood from this graph, the light input into one of the input ports 7 numbered (1_12) and output from one of the output ports 9 numbered (2_16) has a maximum central wavelength difference $\delta\lambda = 0.0987$ nm.

SUMMARY OF THE INVENTION

Accordingly, it is an object of the invention to provide an optical wavelength routing device, in which a maximum central wavelength difference is suppressed to minimum.

According to the invention, an optical wavelength routing device, comprises:

an arrayed waveguide comprising a plurality of waveguides formed on a substrate;

a plurality of input waveguides located on an input side of said arrayed waveguide on said substrate;

a plurality of output waveguides located at an output side of said arrayed waveguide on said substrate;

an input slab waveguide for coupling said input waveguides to said arrayed waveguide on said substrate to provide a first coupling portion on a side of said input waveguides; and an output slab waveguide for coupling the arrayed waveguide on said substrate to provide a second coupling portion on a side of said input waveguides;

wherein a wavelength multiplexed optical signal input to one input waveguide of said input waveguides is demultiplexed to be output from said output waveguides as wavelength demultiplexed optical signals in accordance with a wavelength circulating pattern dependent on a position of said one input waveguide, and wavelength division optical signals input to said input waveguides are multiplexed to be output from one output waveguide of said output waveguides as a wavelength multiplexed optical signal; and wherein said input waveguides and said output waveguides are located at said first and second coupling portions with substantially different intervals, respectively, such that a maximum wavelength difference of optical signals output from said output waveguides is shared by a total of a positive wavelength difference thereof and a negative wavelength difference thereof.

BRIEF DESCRIPTION OF THE DRAWINGS

The invention will be explained in more detail in conjunction with appended drawings, wherein:

FIGS. 1A to 1C are diagrams showing a conventional optical wavelength routing device, wherein FIGS. 6A to 6C are diagrams showing an optical wavelength routing device in a preferred embodiment according to the invention, wherein

DESCRIPTION OF THE PREFERRED EMBODIMENT

Figure 6A:
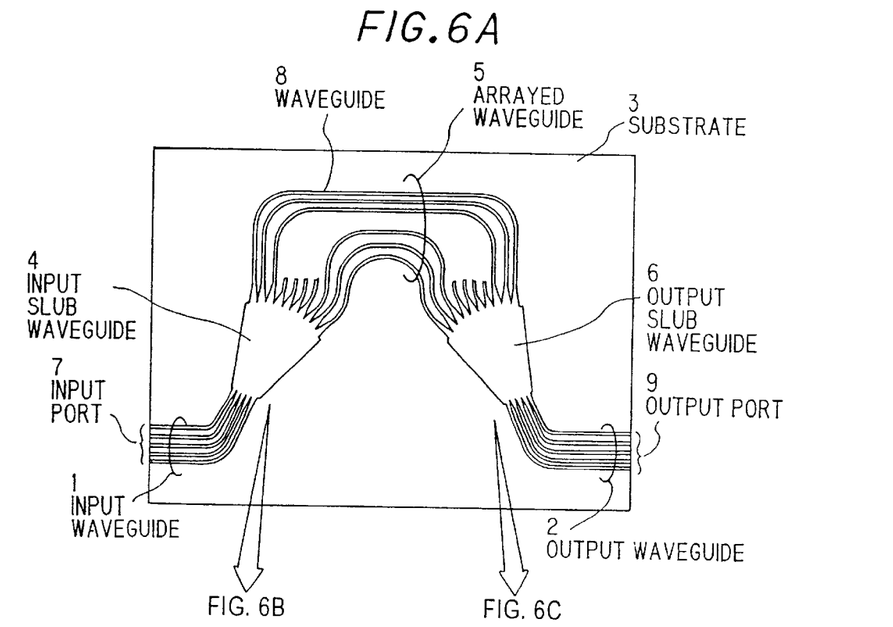
Figures 6B, 6C:
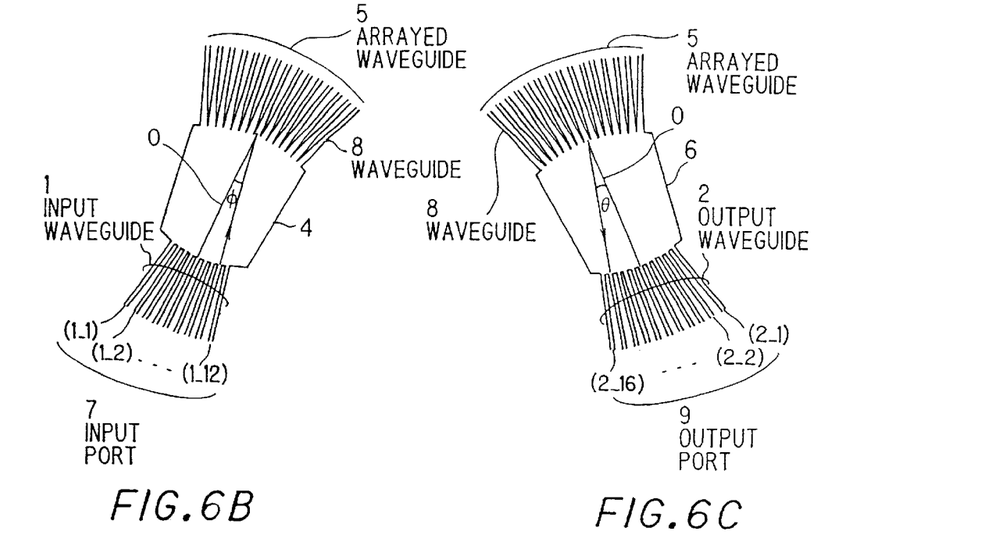
FIGS. 6B and 6C show partial enlarged views of a light input side and a light output side thereof, respectively.

FIGS. 6A to 6C show a structure of a 12×16 channel optical wavelength routing device in a preferred embodiment according to the invention, which is composed of an arrayed waveguide diffraction grating type optical multiplexer/demultiplexer.

As shown in FIG. 6A, the optical wavelength routing device comprises a substrate 3, input waveguides 1 having twelve input ports 7, an input slab waveguide 4 coupled to the input waveguides 1 to radiate a light supplied from the input waveguides 1 with predetermined angles by diffraction, a diffraction grating type arrayed waveguide 5 composed of a plurality of waveguides 8 and coupled to an output side of the input slab waveguide 4 to transmit the light supplied from the input slab waveguide 4 through the waveguides 8, an output slab waveguide 6 coupled to an output side of the arrayed waveguide 5 to focus the radiated lights supplied from the arrayed waveguide 5 with predetermined angles, and output waveguides 2 having sixteen output ports 9 and coupled to an output side of the output slab waveguide 6.

FIGS. 6B and 6C show a light input side and a light output side of the optical wavelength routing device, respectively. In FIG. 6B, the twelve input ports 7 are numbered (1_1) to (1_12), respectively, and an emitting angle of a light emitted from one of the input ports 7 of the input waveguides 1 is expressed as Φ. In FIG. 6C, the sixteen output ports 9 of the output waveguides 2 are numbered (2_1) to (2_16), respectively, and a focusing angle of the light output from respective waveguides 8 of the arrayed waveguide 5 is expressed as θ. Both of the emitting angle Φ and the focusing angle θ are angles formed by respective optical axes of the lights relative to a central line O.

In this optical wavelength routing device, central wavelengths of lights, for which routing operation is conducted, are sixteen wavelengths $\lambda_1$=540 nm to $\lambda_{16}$=1552 nm with a channel interval of $\Delta\lambda_1$=0.8 nm.

The optical wavelength routing device in the preferred embodiment is made of silica like material, and comprises a core made of a material having a constant refractive index and a clad layer made of a material having a refractive index which is less than that of the core by a predetermined value, in which the core is buried in the clad layer. A specific refractive index difference of these refractive indices is 0.8%.

The input and output waveguides 1 and 2 and the respective waveguides 8 of the arrayed waveguide 5 are formed with a height of 6 μm and a width of 6 μm. An equivalent refractive index $n_{eff}(\lambda)$ of a fundamental mode light, which propagates through the input and output waveguides 1 and 2 and the arrayed waveguide 5, is calculated so as to design the device. An equivalent refractive index $n_s(\lambda)$ of the input slab waveguide 4 and the output slab waveguide 6 is approximate to the equivalent refractive index $n_{eff}(\lambda)$ Further, a center interval d between central axes of the two adjacent waveguides 8 at coupling portions between the arrayed waveguide 5 and each of the input slab waveguide 4 and the output slab waveguides 6 is 20 μm, and a focal distance f of both the input and output slab waveguides 4 and 6 is 9.236 mm.

Next, a diffraction order number m is given by the conditions, where $\lambda_{m+1}$ of the formula (2) is less than or equal to $\lambda_m$ and the absolute value $|\lambda_{m+1} - \lambda_1|$ becomes minimum. In the preferred embodiment of the present invention, since the conditions are $\lambda_m = \lambda_{16} + \Delta\lambda_1$ = 1552.8 nm, $n_{eff}(\lambda_{m+1})$=1.4493467, and $n_{eff}(\lambda)$=1.4491545, the diffraction order number m is given as m=118.

Herein, δλ is a maximum central wavelength difference in the conventional manner of designing the optical wavelength routing device. According to the above calculation result, it is given that δλ=0.0987 nm. A locating angle $\theta_i$ ($1 \leq i \leq 16$, i is a natural number) of respective output ports numbered (2_i) of the output waveguides is obtained in accordance with a formula (3). First, ΔL=ΔL, is calculated such that the equation $\lambda = (\Delta_1 + \lambda_{16})/2$ can be established in case of Φ=θ=0:

$$\lambda_{2i} = \{n_s(\lambda_{2i})d/m\}\sin\theta_i + \{n_{eff}(\lambda_{2i}) \Delta L'/m\} \quad (3)$$

Next, $\Delta_{2i}$ is given by following equations:

$$\lambda_{2i} = \lambda_1 - \delta\lambda/4 + (i-1)\Delta\lambda_1 (1 \leq i \leq K) \; \lambda_{2i} = \lambda_{K+1} - \delta\lambda/4 + (i-K-1) \Delta\lambda_2 (K+1 \leq i \leq N) \quad (4)$$

wherein $\Delta\lambda_2 = \Delta\lambda_1 + \delta\lambda/2/$ (M-2), N=16, M=12, and K=N-M+1.

A locating angle $\Phi_i$ ($1 \leq i \leq 12$, i is a natural number) of respective input ports numbered (1_i) of the input waveguides 1 is obtained in accordance with a formula (5) by using the above described ΔL':

$$\lambda_i = \{n_s(\lambda_{1i})d/m\}\sin\Phi_i + \{n_{eff}(\lambda_{1i}) \Delta L'/m\} \quad (5)$$

wherein, $\lambda_{1i}$ is given by a following formula (6):

$$\lambda_{1i} = \lambda_1 - \delta\lambda/4 + (i-1) \Delta\lambda_3 (1 \leq i \leq M) \quad (6)$$

wherein the equation $\Delta\lambda_3 = \Delta\lambda_1 + \delta\lambda/2/(M-1)$ is established.

Finally, a waveguide length difference ΔL of each two adjacent waveguides 8 of the arrayed waveguide 5 is calculated by the formula (1) such that the equation $\lambda = (\lambda_1 + \lambda_{16})/2$ can be established in case of Φ=$\Phi_1$, and θ=0. Accordingly, ΔL=126.3764 μm is given.

By using parameters as calculated above, central wavelengths of lights input from respective input ports 7 and output to respective output ports 9 are calculated, and differences thereof from predetermined central wavelengths are obtained. Thus, central wavelength differences are calculated.

Figure 7:
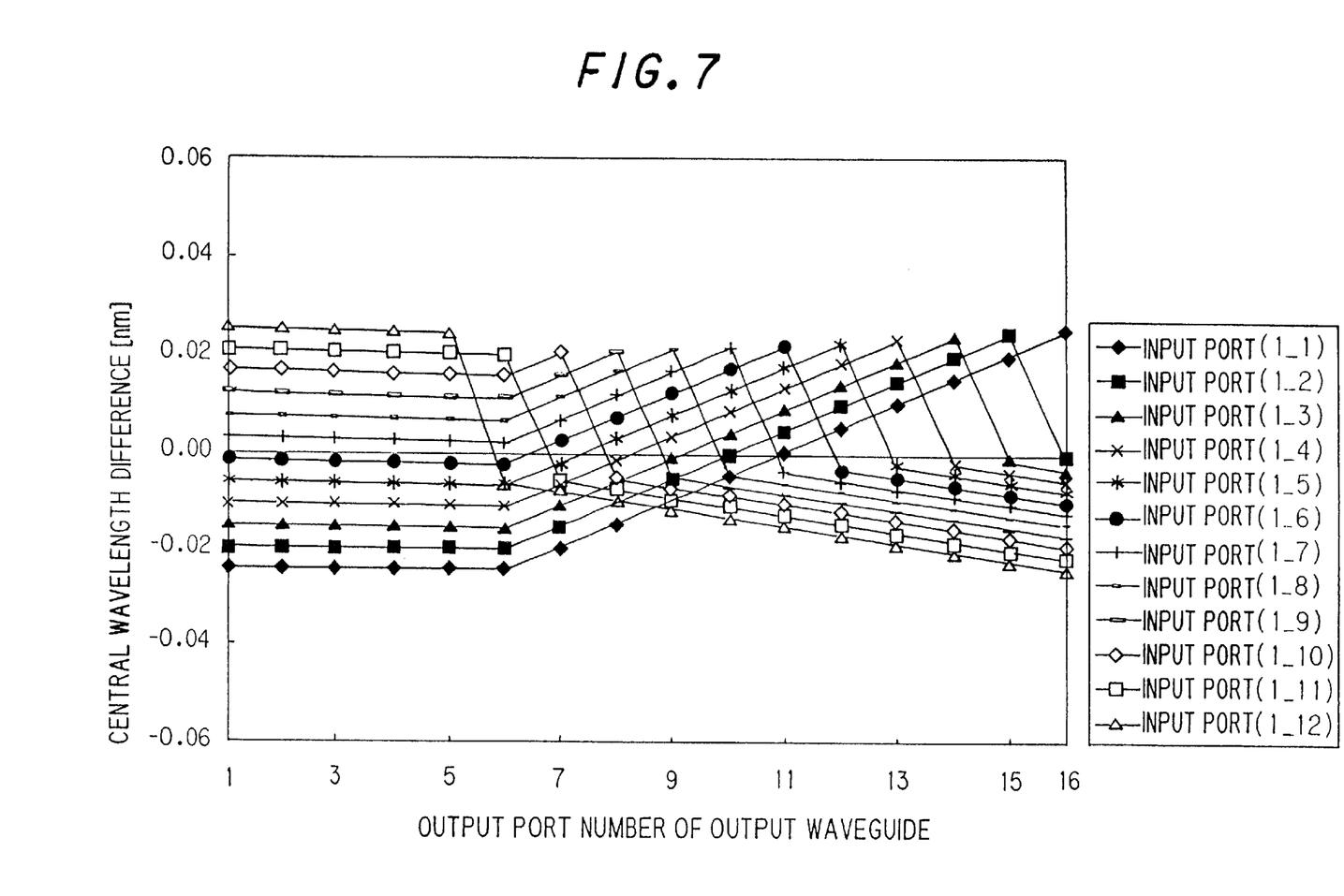
FIG. 7 is a graph showing calculated values of central wavelength differences of an optical wavelength routing device in the preferred embodiment according to the invention.

FIG. 7 shows calculation results of central wavelength differences in an optical wavelength routing device in the preferred embodiment according to the invention. As shown in FIG. 7, when a light is input from one of the input ports 7 numbered (1_12) and output from one of the output ports 9 numbered (2_1), a maximum central wavelength difference δλ becomes δλ10.0256 nm. Namely, the maximum central wavelength difference δλ(0.0256 nm) in the optical wavelength routing device according to the invention is reduced to about ¼ of the maximum central wavelength difference δλ(0.0987 nm) in the conventional optical wavelength routing device.

Next, a method for locating input waveguides land output waveguides 2 in an optical wavelength routing device in the preferred embodiment according to the invention will be explained.

Figure 8:
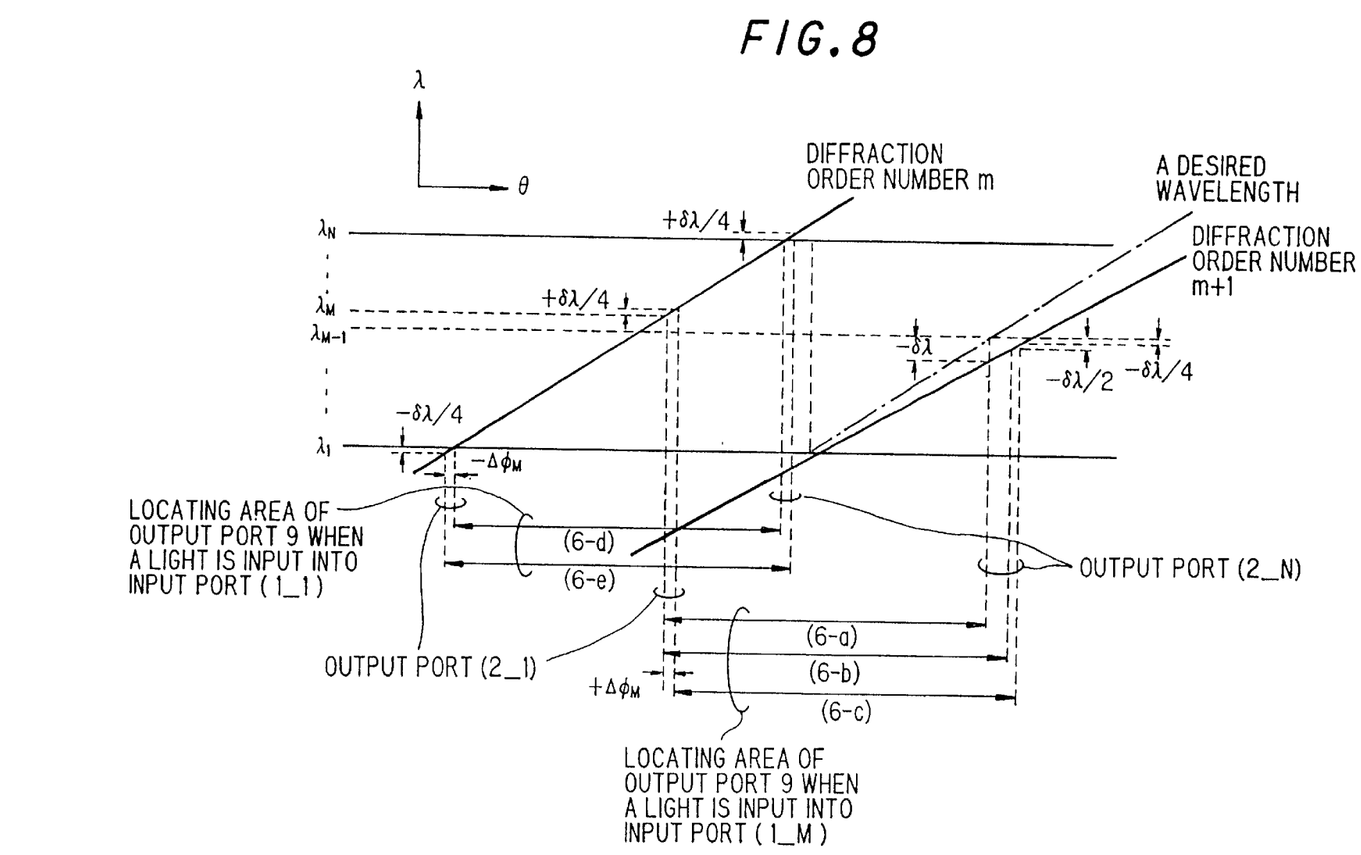
FIG. 8 is a graph showing a relation between locating angles of output ports of output waveguides and central wavelengths of output lights in an optical wavelength routing device in the preferred embodiment according to the invention.

In FIG. 8, locating area of respective output ports 9 of output waveguides 2 in the conventional optical wavelength routing device is indicated by (6-a). In the conventional device, when a light is input to one of the input ports 7 of input waveguides 9 numbered (1_M), a light having a predetermined wavelength $\lambda_M$ is output from one of the output ports 9 of the output waveguides 2 numbered (2_1), and a central wavelength difference of the light output from one of output ports 9 numbered (2_N) becomes −δλ. Herein, δλ is maximum central wavelength difference, when a light is input into one of the input ports 7 of the input waveguides 1 numbered (1_1), plural lights each having one of central wavelengths $\lambda_1, \lambda_2, - - - \lambda_N$ are diffracted by mth order diffraction and output from respective output ports 9 numbered (2_1) to (2_N). Further, when a light is input into the other input ports 7 of the input waveguides 1 numbered (1_2) to (1_M), plural lights each having one of central wavelengths $\lambda_2, - - - \lambda_M$ are output from the output port 9 numbered (2_1).

For reducing the central wavelength difference, a locating area of the respective output ports 9 of the output waveguides 2 is provided in the range indicated as (6-b), so that the central wavelength difference of the output port 9 of the output waveguides 2 numbered (2_N) is reduced to be about −δλ/2.

Further, by shifting a locating angle of one of the input ports 7 of the input waveguides 1 numbered (1_M) by +ΔΦ$_M$ such that the difference of one of the output ports 9 of the output waveguides 2 numbered (2_1) becomes +δλ/4, a locating area of the respective output ports 9 of the output waveguides 2 corresponds equivalently to the range indicated by (6-C), therefore the central wavelength difference of the output port 9 of the output waveguides 2 numbered (2_N) is reduced to be about −δλ/4.

Next, when a light is input to one of input ports 7 of the input waveguides 1 numbered (1_1), according to the above explained method for locating the output waveguides 2, a locating area of the output waveguides is increased. However, by shifting a locating angle of one of the input ports 7 of the input waveguides 1 numbered (1_1) by −ΔΦ$_M$ such that the difference of one of the output port 9 of the output waveguides 2 numbered (2_1) becomes −δλ/4, a locating area of the respective output ports 9 of the output waveguides 2 corresponds equivalently to the range indicated by (6-e), therefore the central wavelength difference of the output port 9 of the output waveguides 2 numbered (2_N) is reduced to be about $+\delta\lambda/4$.

Next, wavelength differences of respective output ports 9 of output waveguides 2 in case that lights are input into input ports 7 numbered (1_1), (1_M), and (1_i) will be explained referring to FIGS. 9 to 11.

Figure 9:
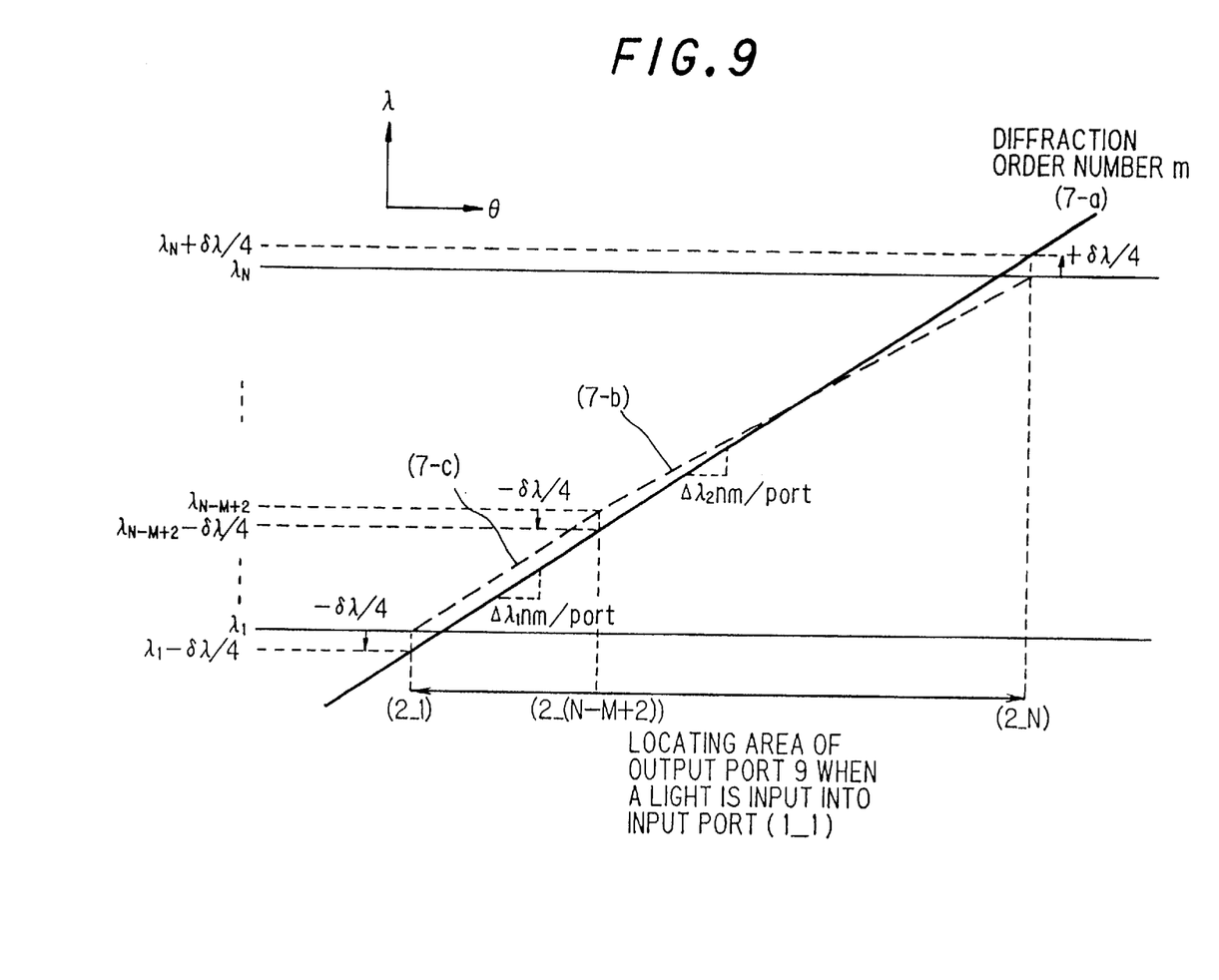
FIG. 9 is a graph showing a relation between locating angles of output ports of output waveguides and central wavelengths of output lights in an optical wavelength routing device in the preferred embodiment according to the invention.

FIG. 9 shows wavelength differences in the optical wavelength routing device according to the invention, when a light is input into the input port 7 numbered (1_1). $\lambda$ solid line (7-a) indicates a wavelength $\lambda$ which is actually output by mth order diffraction which is determined by the formula (1) with an arbitrarily determined $\theta$. Each of broken lines (7-b) and (7-c) indicates a predetermined wavelength of the output light for the arbitrary angle $\theta$. As shown in FIG. 9, according to the optical wavelength routing device of the present invention, when a light is input into the input port 7 numbered (1_1), the central wavelength difference is suppressed to be the range of $\pm\delta\lambda/4$.

Herein, each of adjacent output ports 9 numbered (2_1) to (2_(N−M+2)) is located such that lights having different wavelengths with a channel interval $\Delta\lambda_1$ are output therefrom. Accordingly, a locating interval of focusing angles $\theta$ for each two adjacent output ports 9 numbered (2_1) to (2_(N−M+2)) is almost same as that of the conventional optical wavelength routing device. However, each of adjacent output ports 9 numbered (2_(N−M+2)) to (2_N) is located such that lights having different wavelengths with a channel interval $\Delta\lambda_2=\Delta\lambda_1+\delta\lambda/2/(M-2)$ are output therefrom. Accordingly, a locating interval of focusing angles $\theta$ for each two adjacent output ports 9 numbered (2_(N−M+2)) to (2_N) is larger than that of the conventional optical wavelength routing device.

Figure 10:
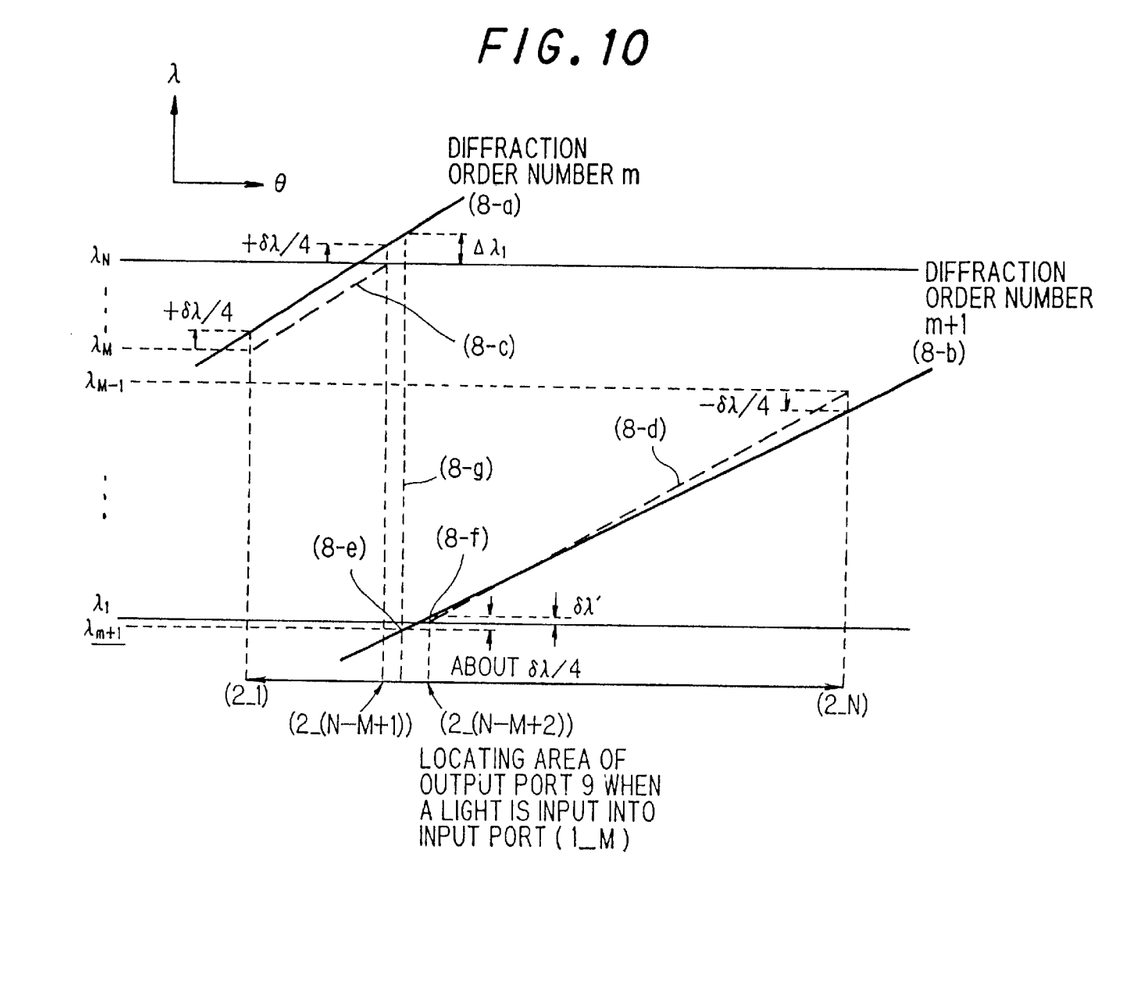
FIG. 10 is a graph showing a relation between locating angles of output ports of output waveguides and central wavelengths of output lights in an optical wavelength routing device in the preferred embodiment according to the invention.

FIG. 10 shows wavelength differences in the optical wavelength routing device according to the invention, when a light is input into the input port 7 numbered (1_M). Each of solid lines (8-a) and (8-b) indicates a wavelength $\lambda$ of the light which is actually output by mth order diffraction and (m+1)th order diffraction, respectively, which is determined by the formula (1) with an arbitrarily determined $\theta$. Each of broken lines (8-c) and (8-d) indicates a predetermined wavelength of the output light for the arbitrarily determined angle $\theta$. Namely, for the arbitrarily determined angle $\theta$, a value, which is calculated by extracting a value of the wavelength $\lambda$ indicated by the solid line from a value of the wavelength $\lambda$ indicated by the broken line, is a central wavelength difference.

First, each of the adjacent output ports 9 numbered (2_1) to (2_(N−M+1)) is located such that lights having different wavelengths with a channel interval $\Delta\lambda_1$ are output therefrom. Accordingly, a locating interval of focusing angles $\theta$ for each two adjacent output ports 9 numbered (2_1) to (2_(N−M+1)) is almost same as that of the conventional optical wavelength routing device. Further, the central wavelength difference of the optical wavelength routing device according to the present invention becomes almost equal to $+\delta\lambda/4$.

Next, a locating interval of focusing angles $\theta$ for each two adjacent output ports 9 numbered (2_(N−M+1)) to (2_(N−M+2)) is provided such that lights having different wavelengths with a channel interval $\Delta\lambda_1$ are output therefrom. Accordingly, if a locating angle of the input port 7 numbered (1_M) is same as that of the conventional device, a wavelength of the light output from the output port 9 numbered (2_(N−M+1)) becomes $\Delta_N$. However, in the present invention, the locating angle of the input port 7 numbered (1_M) is provided such that the wavelength of the light output from the output port 9 numbered (2_(N−M+1)) becomes $\lambda_N+\delta\lambda/4$. Accordingly, when m is a relatively great number, the light output from the output port 9 numbered (2_(N−M+2)) has a wavelength, the value of which is shifted from the coordinates-value (8-e) by $+\{m/(m+1)\}\times\delta\lambda/4$, that is, about $+\delta\lambda/4$. Namely, the coordinates-value (8-f) indicates $\lambda$ and $\theta$ of the light output from the output port 9 numbered (2_(N−M+2)).

Herein, a wavelength difference $\delta\lambda'$ of the output port 9 numbered (2_(N−M+2)) is given by a following formula (7) using the above described $\lambda_{m+1}$:

$$\delta\lambda'\approx\lambda_{m+1}-\lambda_1+\delta\lambda/4 \tag{7}$$

Herein, $\lambda_{m+1}$ corresponds to the coordinates-value (8-e).

In the conventional optical wavelength routing device, $\lambda_{m+1}-\lambda_1$ is a wavelength difference of the light output from the output ports 9 numbered (2_(N−M+2)). Herein, a diffraction order number is m, which is determined such that a free-spectral range in the output direction of a light having a wavelength $\lambda_{N+1}=\lambda_N+\Delta\lambda_1$ indicated by the broken line (8-g) is greater than $N\Delta\lambda_1$, and minimum. Since the relation $\lambda_{m+1}-\lambda_1\leq 0$ is established and the absolute value $|\lambda_{m+1}-\lambda_1|$ becomes minimum, $\delta\lambda'$ is suppressed within the range of $\lambda_{m+1}-\lambda_1$ to $\delta\lambda/4$.

The output ports 9 numbered (2_(N−M+2)) to (2_N) are located such that a central wavelength difference of the output port 9 numbered (2_N) is $-\delta\lambda/4$ and the lights are output from respective output ports 9 with a constant channel interval $\Delta\lambda_2$. Therefore, the wavelength differences are suppressed in the range of $-\delta\lambda/4$ to $\delta\lambda'$.

Figure 11:
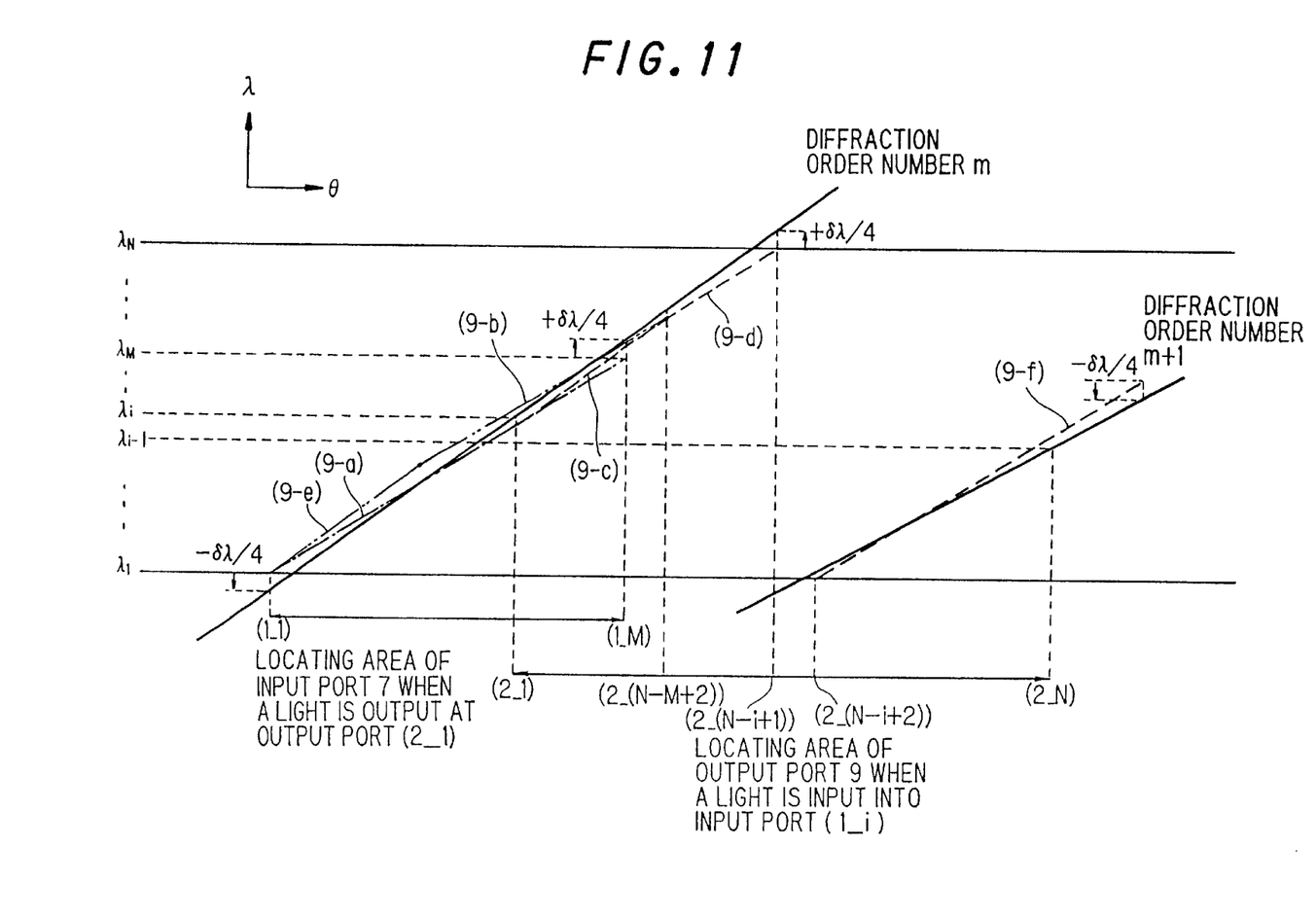
FIG. 11 is a graph showing a relation between locating angles of output ports of output waveguides and central wavelengths of output lights in an optical wavelength routing device in the preferred embodiment according to the invention.

FIG. 11 shows wavelength differences in the optical wavelength routing device according to the invention, when a light is input into the input port 7 numbered (1_i) ($2\leq i\leq M-1$). One dot chain line (9-a) indicates a predetermined wavelength $\lambda$ of the light which is output from the output port 9 numbered (2_1), when the input port 7 of the input waveguides 1, to which the light is input, is varied. A channel interval $\Delta\lambda_3$ of wavelengths of lights, which are input into two adjacent input ports 7 and output from the same output port 9 numbered (2_1), is expressed as $\Delta\lambda_3=\Delta\lambda_1+\delta\lambda/2/(M-1)$. Herein, a channel interval $\Delta\lambda_2$ is expressed as $\Delta\lambda_2=\Delta\lambda_1+\delta\lambda/2/(M-2)$, therefore, when M is relatively great and the channel intervals $\Delta\lambda_2$ and $\Delta\lambda_3$ are approximate to each other, the locating intervals of the input ports 7 and the output ports 9 numbered (2_(N−M+2)) to (2_N) become almost equal to each other. Namely, inclinations of the one dot chain line (9-a) and a two dot chain line (9-b) corresponding to the broken line (7-b) of FIG. 9 become almost equal to each other. In accordance with the above, predetermined wavelengths of the lights output from the output ports 9 numbered (2_1) to (2_(N−i+1)) are indicated by broken lines (9-c) and (9-d). Herein, inclinations of the broken line (9-c) and the two dot chain line (9-e) are equal to each other. The two dots chain lines (9-e) and (9-b) are equivalent to the broken lines (7-c) and (7-b) of FIG. 9, respectively.

On the other hand, a channel interval of the lights input from two adjacent input ports 7 and output from the same output port 9 numbered (2_N) is also expressed as $\Delta\lambda_3$. When the channel intervals $\Delta\lambda/2$ and $\Delta\lambda_3$ are approximate to each other, and the input port 7, to which the light is input, is varied, a predetermined wavelength of the light output from the output port 9 numbered (2_N) is indicated by a broken line (9-f), which is equivalent to the one dot chain line (8-d) of FIG. 10. When a light is input into the input port 7 numbered (1_i) (2≦i≦M−1), wavelengths of the lights output from the output ports 9 numbered (2_(N−i+2)) to (2_1) are indicated by the broken line (9-f).

Accordingly, the wavelength differences of the light input to the input port 7 numbered (1_i) can be suppressed within the range of −δλ/4 to +δλ/4.

According to the optical wavelength routing device of the present invention, by locating the input waveguides 1 and the output waveguides 2 as described above, the wavelength differences of the light can be suppressed within the range of ±δλ/4.

As shown in FIG. 7, a wavelength difference corresponding to the maximum wavelength difference is one which occurs in the combination of the input ports 7 numbered (1_1) and (1_M) and the output ports 9 numbered (2_1) and (2_N). The wavelength difference of these input and output ports is determined by the locating areas of the respective input ports 7 of the input waveguides 1 and the respective output ports 9 of the output waveguides 2. The method for locating the respective output ports 9 is determined in accordance with the wavelengths of output lights, when a light is input into the input port 7 numbered (1_1).

In the conventional optical wavelength routing device, when a light is input into one of the input ports 7 of the input waveguides 1 numbered (1_1), plural lights each having one of central wavelengths $\lambda_1, \lambda_2, \cdots \lambda_N$ are output from respective output ports 9 numbered (2_1) to (2_N). Further, when a light is input into the other input ports 7 of the input waveguides 1 numbered (1_2) to (1_M), the lights having central wavelengths $\lambda_2, \cdots \lambda_M$ are output from one of the output ports 9 numbered (2_1). Herein, the absolute value of the difference between a predetermined wavelength $\lambda_{M-1}$ and a central wavelength $\lambda_{MN}$ of the light, which is input from the input port 7 numbered (1_M) and output to the output port 9 numbered (2_N), is expressed as $|\lambda_{MN}-\lambda_{M-1}|$. If the value of δλ/4 is smaller than the absolute value $|\lambda_{MN}-\lambda_{M-1}|$, the locating area (6-e) of FIG. 8 will be narrowed, so that the range of the wavelength difference of the light input to the input port 7 numbered (1_1) may be decreased. However, since the locating area indicated by (6-c) is equivalent to the locating area indicated by (6-e), the latter will be narrowed. The range of the wavelength difference of the light input to the input port 7 numbered (1_M) will be enlarged, and finally the maximum wavelength difference becomes greater than δλ/4.

To the contrary, if the value of δλ/4 is greater than the absolute value $|\lambda_{MN}-\lambda_{M-1}|$, the locating area (6-e) of FIG. 8 will be enlarged, so that the range of the wavelength difference of the light, which is input to the input port 7 numbered (1_1), may be increased. Accordingly, the value of δλ is optimized when it is equal to the absolute value $|\lambda_{MN}-\lambda_{M-1}|$.

In the above description, the optical wavelength routing device in the preferred embodiment according to the invention is explained. However, it is not necessary to provide the locating angles of the input ports 7 numbered (1_2) to (1-(M−1)) with the locating interval, which is substantially uniform and corresponds to the above described channel interval $\Delta\lambda_3$. It is sufficient to determine locating angles, such that the central wavelength difference can be provided in the range of central wavelength differences of the lights input to the input ports 7 numbered (1_1) and (1_M). In the preferred embodiment shown in FIG. 7, a range of the central wavelength of the light input to the input port 7 numbered (1_5) becomes minimum, comparing to those of the lights input to the other input ports 7. Herein, a range of the central wavelength of the light, which is input to the input port 7 numbered (1_5), is 0.0303 nm. Accordingly, the locating angle of the input port 7 numbered (1_5) can be varied in the range which is larger than those of the other input ports 7.

In the preferred embodiment shown in FIG. 6, the optical wavelength routing device made of silica like material is explained, however, similar effects can be obtained by using the other materials.

The method for locating input and output ports in the optical wavelength routing device can be applied not only to M×N channel optical wavelength routing device, but also to optical wavelength division multiplexer/demultiplexer, Add/Drop filter, etc.

As described above, according to an optical wavelength routing device of the present invention, input ports of input waveguides and output ports of output waveguides are located with different intervals, such that a maximum wavelength difference of WDM optical signals is shared by a total of a positive wavelength difference and a negative wavelength difference. Therefore, the wavelength differences can be decreased without changing the basic structure of the optical wavelength routing device.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical wavelength routing device, comprising:
   an arrayed waveguide comprising a plurality of waveguides formed on a substrate;
   a plurality of input waveguides located on an input side of said arrayed waveguide on said substrate;
   a plurality of output waveguides located on an output side of said arrayed waveguide on said substrate;
   an input slab waveguide for coupling said input waveguides to said arrayed waveguide on said substrate to provide a first coupling portion on a side of said input waveguides; and
   an output slab waveguide for coupling said arrayed waveguide on said substrate to said output waveguides to provide a second coupling portion on a side of said output waveguides;
   wherein a wavelength multiplexed optical signal input to one input waveguide of said input waveguides is demultiplexed to be output from said output waveguides as wavelength demultiplexed optical signals in accordance with a wavelength circulating pattern dependent on a position of said one input waveguide, and wavelength division optical signals input to said input waveguides are multiplexed to be output from one output waveguide of said output waveguides as a wavelength multiplexed optical signal; and
   wherein said input waveguides and said output waveguides are located at said first and second coupling portions with substantially different intervals, respectively, such that a maximum wavelength difference of optical signals output from said output waveguides is shared by a total of a positive wavelength difference thereof and a negative wavelength difference thereof.

2. An optical wavelength routing device, according to claim 1, wherein:
   said output waveguides having a total number N (N=K+L) are arranged such that a light input to the first one of said input waveguides is divided to be output from said output waveguides, lights output from K output waveguides among said N output waveguides having central wavelengths $\lambda_1-\delta\lambda/4$, $\lambda_1-\delta\lambda/4+\Delta\lambda_1$, $\lambda_1-\delta\lambda/4+2\Delta\lambda_1$, - - - $\lambda_1-\delta\lambda/4+(K-1)\Delta\lambda_1$ with an equal wavelength interval $\Delta\lambda_1$ ($\lambda_1$ is a predetermined wavelength of an optical signal, $0<\lambda_1$, and $0<\delta\lambda<\Delta\lambda_1$), and lights output from L output waveguides among said N output waveguides having central wavelengths $\lambda_1-\delta\lambda/4+K\Delta\lambda_1$, $\lambda_1-/4+K\Delta\lambda_1+\Delta\lambda_2$, $\lambda_1-\delta\lambda/4+K\Delta\lambda_1+2\Delta\lambda_2$ - - - $\lambda_1-\delta\lambda/4+K\Delta\lambda_1+(L-1)\Delta\lambda_2$ with an equal wavelength interval $\Delta\lambda_2$ ($0<\Delta\lambda_2$).

3. An optical wavelength routing device, according to claim 2, wherein:

said input waveguides having a total number M (M=L+1) are arranged such that when lights having central wavelengths $\lambda_1-\delta\lambda/4$ and $\lambda_1+(M-1)\Delta\lambda_1+\delta\lambda/4$ are input to the first and Mth input waveguides, respectively, said lights are output from the first one of said N output waveguides.

4. An optical wavelength routing device, according to claim 2, wherein:

said input waveguides having a total number M (M=L+1) are arranged such that when lights having central wavelengths $\lambda_1-\delta\lambda/4$, $\lambda_1-\delta\lambda/4+\Delta\lambda_3$, $\lambda_1-\delta\lambda/4+\Delta\lambda_3$, - - - $\lambda_1-\delta\lambda/4+(M-1)\Delta\lambda_3$ with an equal wavelength interval $\Delta\lambda_3$ ($\Delta\lambda_3=\Delta\lambda_1+\delta\lambda/2/(M-1)$) are input to said M input waveguides, said lights are output from the first one of said N output waveguides.

5. An optical wavelength routing device, according to claim 3, wherein:

when a light having said central wavelength $\lambda_1-\delta\lambda/4$ which is input to said first one of said input waveguides is diffracted by mth order diffraction (m is an integer) and output from said first one of said output waveguides, and a light input to said first one of said input waveguides is diffracted by mth order diffraction and output as a light having a central wavelength $\lambda_{N+1}$ ($\lambda_{N+1}=\lambda_N+\Delta\lambda_1$) from (N+1)th output waveguide, a free-spectral range of said light output from said (N+1)th output waveguide is greater than $N\Delta\lambda_1$ and minimum.

6. An optical wavelength routing device, according to claim 3, wherein:

said equal wavelength interval $\Delta\lambda_2$ is given by:

$$\Delta\lambda_2=\Delta\lambda_1+\delta\lambda/2/(M-2).$$

7. An optical wavelength routing device, according to claim 3, wherein:

said input slab waveguide, said arrayed waveguide, and said output slab waveguide are arranged such that when a light is input to said first one of said input waveguides, plural lights each having one of central wavelengths $\lambda_1, \lambda_2, - - - \lambda_N$ with said equal wavelength interval $\Delta\lambda_1$ are diffracted by said mth order diffraction and output from said N output waveguides, and when lights are input to the second to Mth input waveguides, plural lights each having one of central wavelengths $\lambda_2, \lambda_3, - - - \lambda_{M-1}, \lambda_M$ are output from said first output waveguide by said mth order diffraction; and wherein said $\delta\lambda$ is equal to the absolute value $|\lambda_{MN}-\lambda_{M-1}|$, which is a difference between said central wavelength $\lambda_{M-1}$ and a central wavelength $\lambda_{MN}$ of a light input to said Mth input waveguide and output from Nth output waveguide by (m+1)th order diffraction.

8. An optical wavelength routing device, comprising:

an arrayed waveguide comprising a plurality of waveguides formed on a substrate;

a plurality of input waveguides located on an input side of said arrayed waveguide on said substrate;

a plurality of output waveguides located on an output side of said arrayed waveguide on said substrate an input slab waveguide for coupling said plurality of input waveguides to said arrayed waveguide on said substrate to provide a first coupling portion on a side of said plurality of input waveguides; and an output slab waveguide for coupling said arrayed waveguide on said substrate to said plurality of output waveguides to provide a second coupling portion on a side of said plurality of output waveguides;

wherein a wavelength multiplexed optical signal input to one input waveguide of said plurality of input waveguides is demultiplexed to be output from said plurality of output waveguides as wavelength demultiplexed optical signals in accordance with a wavelength circulating pattern dependent on a position of said one input waveguide, and wavelength division optical signals input to said plurality of input waveguides are multiplexed to be output from one output waveguide of said plurality of output waveguides as a wavelength multiplexed optical signal; and wherein said plurality of input waveguides are coupled to said input slab waveguide, and adjacent ones of a predetermined number of said plurality of output waveguides are located with a first interval and adjacent ones other than said predetermined number of said plurality of output waveguides are located with a second interval different from said first interval such that a maximum wavelength difference of optical signals output from said plurality of output waveguides is shared by a total of a positive wavelength difference thereof and a negative wavelength difference thereof.

9. An optical wavelength routing device, according to claim 8, wherein: said plurality of output waveguides having a total number N (N=K+L) are arranged such that a light input to the first one of said plurality of input waveguides is divided to be output from said plurality of output waveguides, lights output from K output waveguides among said N output waveguides having central wavelengths $\lambda_1-\delta\lambda/4$, $\lambda_1-\delta\lambda/4+\Delta\lambda_1$, $\lambda_1-\delta\lambda/4+2\Delta\lambda_1$, - - - $\lambda_1-\delta\lambda/4+(K-1)\Delta\lambda_1$ with an equal wavelength interval $\Delta\lambda_1$ ($\lambda_1$ is a predetermined wavelength of an optical signal, $0<\lambda_1$, and $0<\delta\lambda<\Delta\lambda_1$), and lights output from L output waveguides among said N output waveguides having central wavelengths $\lambda_1-\delta\lambda/4+K\Delta\lambda_1$, $\lambda_1-\delta\lambda/4+K\Delta\lambda_1+\Delta\lambda_2$, $\lambda_1-\delta\lambda/4+K\Delta\lambda_1+2\Delta\lambda_2$ - - - $\lambda_1-\delta\lambda/4+K\Delta\lambda_1+(L-1)\Delta\lambda_2$ with an equal wavelength interval $\Delta\lambda_2$ ($\Delta\lambda_2=\Delta\lambda_1+\delta\lambda/2/(M-2)$, $0<\Delta\lambda_2$).

10. An optical wavelength routing device, according to claim 9, wherein: said plurality of input waveguides, having a total number M (M=L+1) are arranged such that when lights having central wavelengths $\lambda_1-\delta\lambda/4$ and $\lambda_1+(M-1)\Delta\lambda_1+\delta\lambda/4$ are input to the first and Mth input waveguides, respectively, said lights are output from the first one of said N output waveguides.

11. An optical wavelength routing device, according to claim 9, wherein:

said plurality of input waveguides having a total number M (M=L+1) are arranged such that when lights having central wavelengths $\lambda_1-\delta\lambda/4$, $\lambda_1-\delta\lambda/4+\Delta\lambda_3$, $\lambda_1-\delta\lambda/4+2\Delta\lambda_3$, - - - $\lambda_1-\delta\lambda/4+(M-1)\Delta\lambda_3$ with an equal wavelength interval $\Delta\lambda_3$ ($\Delta\lambda_3=\Delta\lambda_1+\delta\lambda/2/(M-1)$) are input to said M input waveguides, said lights are output from the first one of said N output waveguides.

12. An optical wavelength routing device, according to claim 10, wherein: when a light having said central wavelength $\lambda_1-\delta\lambda/4$ which is input to said first one of said input waveguides is diffracted by mth order diffraction (m is an integer) and output from said first one of said plurality of output waveguides, and a light input to said first one of said input waveguides is diffracted by mth order diffraction and output as a light having a central wavelength $\lambda_{N+1}$ ($\lambda_{N+1}=\lambda_N+\Delta\lambda_1$) from (N+1)th output waveguide, a free-spectral range of said light output from said (N+1)th output waveguide is greater than N $\Delta\lambda_1$ and minimum.

13. An optical wavelength routing device, according to claim 10, wherein:

said equal wavelength interval $\Delta\lambda_2$ is given by: $\Delta\lambda_2=\Delta\lambda_1+\delta\lambda/2/(M-2)$.

14. An optical wavelength routing device, according to claim 10, wherein: said input slab waveguide, said arrayed waveguide, and said output slab waveguide are arranged such that when a light is input to said first one of said plurality of input waveguides, plural lights each having one of central wavelengths $\lambda_1, \lambda_2, --- \lambda_N$ with said equal wavelength interval $\Delta\lambda_1$ are diffracted by said mth order diffraction and output from said N output waveguides, and when lights are input to the second to Mth input waveguides, plural lights each having one of central wavelengths $\lambda_2, \lambda_3, --- \lambda_{M-1}, \lambda_M$ are output from said first output waveguide by said mth order diffraction; and wherein said $\delta\lambda$ is equal to the absolute value $|\lambda_{MN}-\lambda_{M-1}|$, which is a difference between said central wavelength $\lambda_{M-1}$, and a central wavelength $\lambda_{MN}$ of a light input to said Mth input waveguide and output from Nth output waveguide by (m+1)th order diffraction.

* * * * *